(12) United States Patent
Weston et al.

(10) Patent No.: US 12,005,886 B2
(45) Date of Patent: Jun. 11, 2024

(54) METHODS AND APPARATUS TO CONTROL STABILITY OF A VEHICLE AND TRAILER

(71) Applicant: Ford Global Technologies, LLC, Dearborn, MI (US)

(72) Inventors: Keith Weston, Canton, MI (US); Matthew Johnson, Toledo, OH (US); Andrew Denis Lewandowski, Sterling Heights, MI (US); Brendan Diamond, Grosse Pointe, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 4 days.

(21) Appl. No.: 17/727,450

(22) Filed: Apr. 22, 2022

(65) Prior Publication Data
US 2023/0339455 A1    Oct. 26, 2023

(51) Int. Cl.
*B60W 30/02* (2012.01)
*B60G 17/016* (2006.01)
*B60W 40/114* (2012.01)

(52) U.S. Cl.
CPC ........... *B60W 30/02* (2013.01); *B60G 17/016* (2013.01); *B60W 40/114* (2013.01); *B60G 2300/044* (2013.01); *B60G 2400/0513* (2013.01); *B60G 2500/20* (2013.01); *B60W 2510/207* (2013.01); *B60W 2520/14* (2013.01); *B60W 2530/207* (2020.02); *B60W 2710/22* (2013.01); *B60W 2720/16* (2013.01)

(58) Field of Classification Search
CPC .... B60W 30/02; B60W 40/114; B60G 17/016
See application file for complete search history.

(56) References Cited

U.S. PATENT DOCUMENTS

| 3,700,261 | A | * | 10/1972 | Suckow | B60D 1/345 280/455.1 |
| 5,430,647 | A | | 7/1995 | Raad et al. | |
| 6,959,970 | B2 | | 11/2005 | Tseng | |
| 7,506,885 | B2 | | 3/2009 | Colibert | |
| 8,328,222 | B1 | * | 12/2012 | Roeber | B60D 1/247 280/406.1 |
| 2004/0079557 | A1 | * | 4/2004 | Saxon | G01G 19/086 177/136 |
| 2006/0033308 | A1 | * | 2/2006 | Waldbauer | B60T 8/241 280/455.1 |
| 2009/0198425 | A1 | * | 8/2009 | Englert | B60D 1/58 701/70 |
| 2011/0175317 | A1 | * | 7/2011 | Legros | B60G 11/27 280/124.157 |
| 2017/0291465 | A1 | * | 10/2017 | Christoff | B60G 3/20 |

(Continued)

*Primary Examiner* — Peter D Nolan
*Assistant Examiner* — Mikko Okechukwu Obioha
(74) *Attorney, Agent, or Firm* — Lorne Forsythe; Hanley, Flight & Zimmerman, LLC

(57) ABSTRACT

Methods and apparatus to control stability of a vehicle and trailer are disclosed. An example apparatus to control stability of a vehicle and trailer includes stability monitoring circuitry to determine, based on sensor data from one or more sensors of the vehicle, whether a vehicle stability condition associated with the vehicle is satisfied, and stability control circuitry to, in response to the vehicle stability condition not being satisfied, adjust a load distribution on front wheels and rear wheels of the vehicle by adjusting a vehicle pitch.

20 Claims, 8 Drawing Sheets

(56) References Cited

U.S. PATENT DOCUMENTS

| | | | |
|---|---|---|---|
| 2018/0154726 A1* | 6/2018 | Fida | B60G 17/017 |
| 2019/0047346 A1* | 2/2019 | Carpenter | B60G 17/0155 |
| 2020/0164711 A1* | 5/2020 | Tuhro | B60G 17/0523 |
| 2021/0039631 A1* | 2/2021 | Ito | B60T 7/12 |
| 2022/0018703 A1* | 1/2022 | Anderson | B60D 1/247 |
| 2022/0041061 A1* | 2/2022 | Kang | B60L 15/2018 |

* cited by examiner

METHODS AND APPARATUS TO CONTROL STABILITY OF A VEHICLE AND TRAILER

FIELD OF THE DISCLOSURE

This disclosure relates generally to vehicles and, more particularly, to methods and apparatus to control stability of a vehicle and trailer.

BACKGROUND

A trailer hitch can be used to couple a trailer to a vehicle to increase a towing capacity thereof. In some cases, a weight of the trailer on the vehicle alters a load distribution on wheels of the vehicle. In some cases, steering and/or maneuvering capabilities of the vehicle may vary based on the load distribution. Accordingly, a combination of the vehicle and the trailer can have different steering and/or maneuvering capabilities compared to the vehicle alone.

Figure 1:
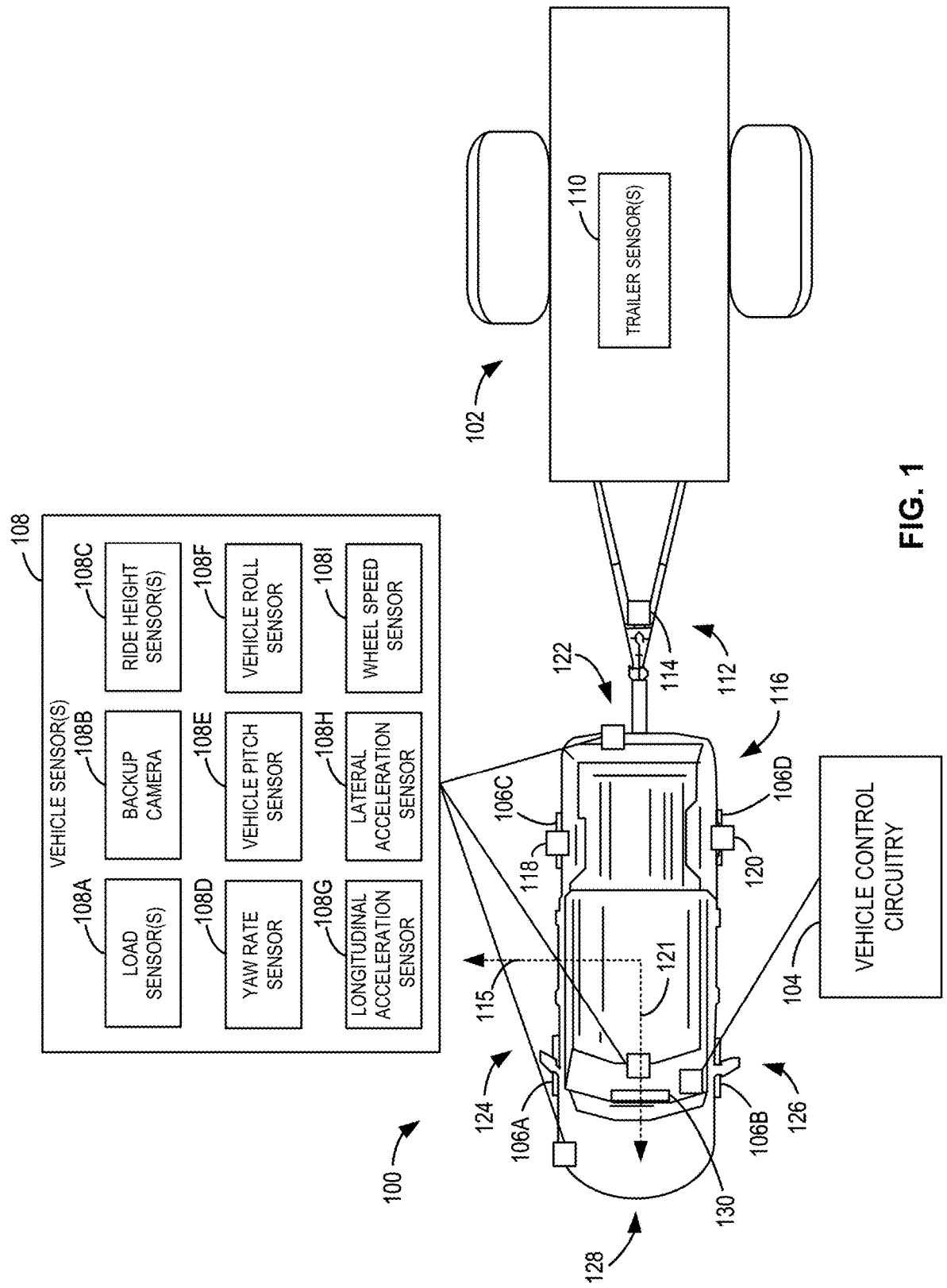
FIG. 1 illustrates an example vehicle and an example trailer, where the example vehicle implements example vehicle control circuitry in accordance with teachings of this disclosure.

The figures are not to scale. Instead, the thickness of the layers or regions may be enlarged in the drawings. Although the figures show layers and regions with clean lines and boundaries, some or all of these lines and/or boundaries may be idealized. In reality, the boundaries and/or lines may be unobservable, blended, and/or irregular. In general, the same reference numbers will be used throughout the drawing(s) and accompanying written description to refer to the same or like parts. As used herein, unless otherwise stated, the term "above" describes the relationship of two parts relative to Earth. A first part is above a second part, if the second part has at least one part between Earth and the first part. Likewise, as used herein, a first part is "below" a second part when the first part is closer to the Earth than the second part. As noted above, a first part can be above or below a second part with one or more of: other parts therebetween, without other parts therebetween, with the first and second parts touching, or without the first and second parts being in direct contact with one another. As used in this patent, stating that any part (e.g., a layer, film, area, region, or plate) is in any way on (e.g., positioned on, located on, disposed on, or formed on, etc.) another part, indicates that the referenced part is either in contact with the other part, or that the referenced part is above the other part with one or more intermediate part(s) located therebetween. As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name. As used herein, "approximately" and "about" refer to dimensions that may not be exact due to manufacturing tolerances and/or other real world imperfections. As used herein "substantially real time" refers to occurrence in a near instantaneous manner recognizing there may be real world delays for computing time, transmission, etc. Thus, unless otherwise specified, "substantially real time" refers to real time +/−1 second. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events. As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmed with instructions to perform specific operations and including one or more semiconductor-based logic devices (e.g., electrical hardware implemented by one or more transistors). Examples of processor circuitry include programmed microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of the processing circuitry is/are best suited to execute the computing task(s).

DETAILED DESCRIPTION

A trailer can be coupled to a vehicle to increase a towing capacity of the vehicle. In some cases, a weight of the trailer on the vehicle alters a load distribution of the vehicle, thus altering steering and/or maneuvering capabilities thereof. In some cases, an operator of the vehicle can manually adjust the load distribution by adjusting chains of a load-distributing trailer hitch when the vehicle is stationary. However, the load distribution may vary during vehicle travel, resulting in instability such as understeer and/or oversteer of the vehicle. In some cases, instability occurs when external forces (e.g., wind on a side of the trailer, uneven terrain, etc.) cause the trailer to unintentionally pivot and/or tilt relative to the vehicle, slippery surface conditions (e.g., due to inclement weather conditions) reduce traction of wheels of the vehicle, and/or the vehicle is steered along sudden and/or sharp turns. As disclosed herein, "understeer" refers to a condition in which front wheels of the vehicle have reduced traction compared to rear wheels of the vehicle, resulting in the vehicle turning less than an amount commanded by an operator of the vehicle. Conversely, "oversteer" refers to a condition in which rear wheels of the vehicle have reduced traction compared to the front wheels, resulting in the vehicle turning more than the amount commanded by the operator. In some cases, understeer and/or oversteer of the vehicle may reduce the operator's ability to accurately steer the vehicle along a desired path.

Examples disclosed herein reduce instability of a vehicle and trailer by actively controlling a load distribution on the vehicle. Example vehicle control circuitry disclosed herein obtains sensor data from one or more sensors on the vehicle and/or the trailer. In some examples, the vehicle control circuitry determines, based on the sensor data, a vehicle stability condition associated with the vehicle. For example, the vehicle control circuitry calculates a vehicle stability index based on the sensor data and compares the vehicle stability index to one or more thresholds. In such examples, the vehicle control circuitry detects understeer of the vehicle when the vehicle stability index does not satisfy a first threshold, and detects oversteer of the vehicle when the vehicle stability index does not satisfy a second threshold. In response to detecting understeer and/or oversteer of the vehicle, the example vehicle control circuitry shifts the load distribution forward and/or rearward by automatically adjusting tension on chains of a trailer hitch. Additionally or alternatively, the vehicle control circuitry shifts the load distribution by controlling air springs of a vehicle suspension system. Advantageously, examples disclosed herein automatically control the load distribution without manual input by the operator, thus reducing instability and/or improving steering capabilities of the vehicle during travel.

FIG. 1 illustrates an example vehicle 100 and an example trailer 102 coupled thereto. The example vehicle 100 implements example vehicle control circuitry 104 in accordance with teachings of this disclosure. In some examples, the vehicle control circuitry 104 adjusts a load distribution on example wheels 106 of the vehicle 100, where the wheels 106 include example front wheels 106A, 106B and example rear wheels 106C, 106D. In this example, the vehicle control circuitry 104 is electrically and/or communicatively coupled to one or more example vehicle sensors 108 implemented on the vehicle 100 and/or one or more example trailer sensors 110 implemented on the trailer 102.

In the illustrated example of FIG. 1, the trailer 102 is coupled to the vehicle 100 via an example trailer hitch (e.g., a load distributing trailer hitch) 112. In this example, an example tensioning system (e.g., an auto tensioning chain system) 114 is implemented on the trailer hitch 112 to control tension in one or more chains of the trailer hitch 112. In some examples, the tensioning system 114 adjusts a pitch (e.g., a pitch angle, a vehicle pitch) of the vehicle 100 and, thus, the load distribution on the wheels 106 of the vehicle 100 by increasing or decreasing the tension in the chain(s). For example, in response to tightening and/or otherwise increasing the tension in the chain(s), the tensioning system 114 reduces the pitch of the vehicle 100, where the pitch is measured relative to an example pitch axis (e.g., vertical axis) 115 in FIG. 1. In such examples, reducing the pitch of the vehicle 100 shifts the load distribution to the front wheels 106A, 106B. Conversely, in response to releasing and/or otherwise reducing the tension in the chain(s), the tensioning system 114 increases the pitch of the vehicle 100 and shifts the load distribution to the rear wheels 106C, 106D. In the illustrated example of FIG. 1, the vehicle control circuitry 104 is communicatively and/or operatively coupled to the tensioning system 114 to control operation thereof. For example, the vehicle control circuitry 104 provides control signals to the tensioning system 114 to cause the tensioning system 114 to increase and/or decrease the tension in the chain(s).

In the illustrated example of FIG. 1, the vehicle control circuitry 104 is further communicatively and/or operatively coupled to an example suspension system (e.g., an active suspension system) 116 of the vehicle 100. In this example, the suspension system 116 includes a first example air spring 118 operatively coupled to the first rear wheel 106C and a second example air spring 120 operatively coupled to the second rear wheel 106D. In some examples, the suspension system 116 can actuate the first air spring 118 and/or the second air spring 120 to adjust the pitch of the vehicle 100. For example, the suspension system 116 can direct flow of air into the first and second air springs 118, 120 to cause extension thereof. In response to extension of the first and second air springs 118, 120, a rear ride height of the vehicle 100 increases, where the rear ride height corresponds to a distance from the ground to a rear end 122 of the vehicle 100. In such examples, increasing the rear ride height reduces the pitch of the vehicle 100. Conversely, the suspension system 116 can direct flow of air into or out of the first and second air springs 118, 120 to cause retraction thereof. In response to retraction of the first and second air springs 118, 120, the rear ride height of the vehicle 100 is reduced, thus increasing the pitch of the vehicle 100. In some examples, the suspension system 116 can individually extend and/or retract the first and second air springs 118, 120.

Additionally or alternatively, the suspension system 116 can include one or more air springs implemented on the front wheels 106A, 106B. In such examples, the suspension system 116 can control the pitch by extending and/or retracting the air springs on the front wheels 106A, 106B to raise and/or lower a front ride height of the vehicle 100, where the front ride height corresponds to a distance from the ground to a front end 128 of the vehicle 100. While the suspension system 116 in FIG. 1 uses the air springs 118, 120 to control the vehicle pitch, one or more different devices (e.g., leaf springs, coil springs, hydraulic actuators, etc.) may be used in the suspension system 116 instead.

In the illustrated example of FIG. 1A, the vehicle control circuitry 104 is communicatively coupled to one or more of the example vehicle sensors 108 to obtain sensor data (e.g., vehicle sensor data) therefrom. In this example, the vehicle sensors 108 include one or more load sensors (e.g., onboard scales (OBS)) 108A, an example backup camera (e.g., a rear camera) 108B, example ride height sensors 108C, an example yaw rate sensor 108D, an example vehicle pitch sensor 108E, an example vehicle roll sensor 108F, an example longitudinal acceleration sensor 108G, and example lateral acceleration sensor 108H, and an example wheel speed sensor 108I. In some examples, one or more other sensors may be used in addition to or instead of the vehicle sensors 108 shown in FIG. 1. In some examples, the vehicle control circuitry 104 is further communicatively coupled to the example trailer sensors 110 to obtain trailer sensor data therefrom. The trailer sensor data can include, for example, a trailer pitch, a trailer weight, a trailer acceleration, etc.

In this example, the vehicle sensors 108 and/or the trailer sensors 110 are configured to send sensor data (e.g., the vehicle sensor data and/or the trailer sensor data) to the vehicle control circuitry 104 for use in determining a vehicle stability condition associated with the vehicle 100. In some examples, the vehicle control circuitry 104 determines and/or otherwise calculates a vehicle stability index based on the sensor data. In such examples, the vehicle control circuitry 104 compares the vehicle stability index to one or more thresholds to determine whether instability of the vehicle 100 and/or the trailer 102 is present. In some examples, in response to detecting instability (e.g., oversteer or understeer) of the vehicle 100 and/or the trailer 102, the vehicle control circuitry 104 adjusts, via at least one of the tensioning system 114 or the suspension system 116, the load distribution of the vehicle 100 to reduce the instability and/or improve maneuverability of the vehicle 100.

In the illustrated example of FIG. 1, the vehicle 100 includes an example user interface 130 to display instructions and/or indications to an operator of the vehicle 100. In some examples, the user interface 130 is communicatively coupled to the vehicle control circuitry 104. The vehicle control circuitry 104, in response to detecting instability of the vehicle 100 and/or the trailer 102, causes the user interface 130 to display an indication (e.g., a warning) to the operator that instability has been detected. In some examples, the vehicle control circuitry 104 causes the user interface 130 to display instructions to the operator. For example, the vehicle control circuitry 104 can cause the user interface 130 to generate a visual and/or audible (e.g., verbal) instruction to the operator to increase a speed of the vehicle 100, reduce the speed of the vehicle 100, steer the vehicle 100 to a side of the road, etc.

Figure 2:
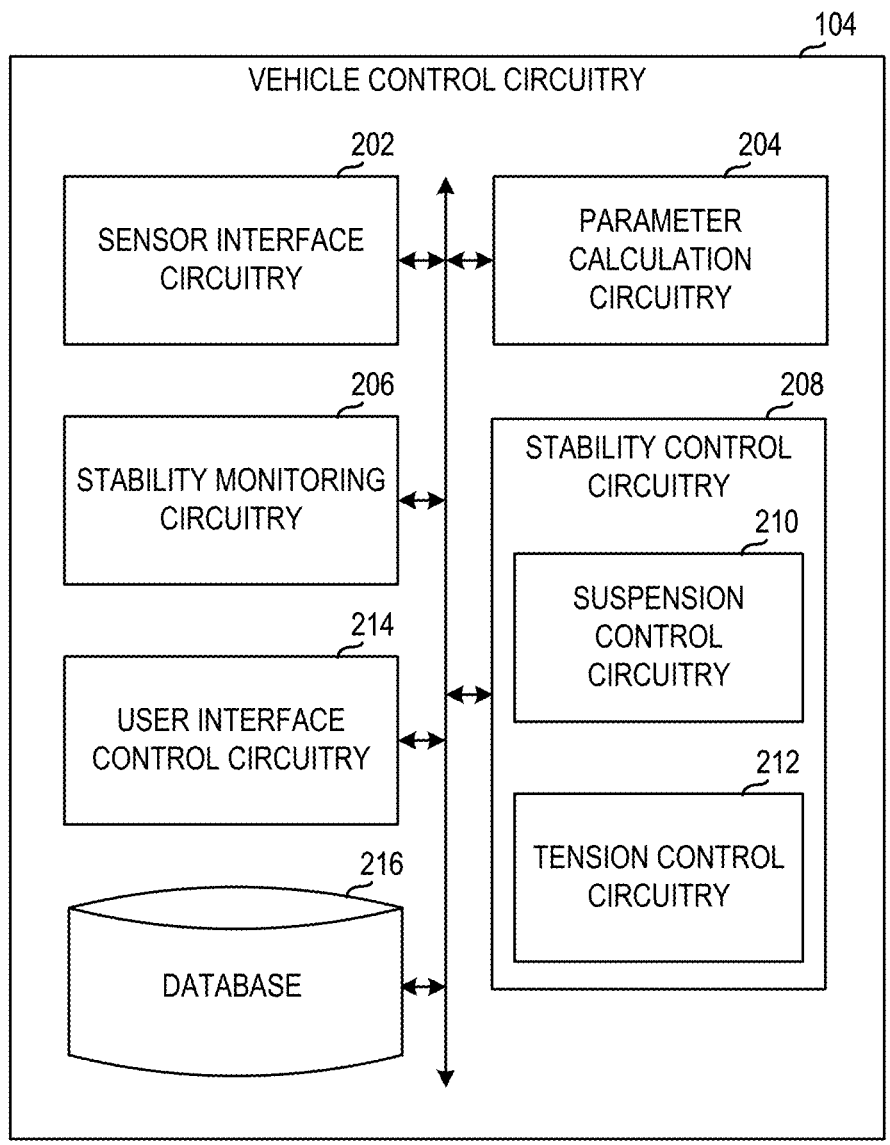
FIG. 2 is a block diagram of the example vehicle control circuitry of FIG. 1.

FIG. 2 is a block diagram of the example vehicle control circuitry 104 of FIG. 1. In the illustrated example of FIG. 2, the vehicle control circuitry 104 includes example sensor interface circuitry 202, example parameter calculation circuitry 204, example stability monitoring circuitry 206, example stability control circuitry 208 including example suspension control circuitry 210 and example tension control circuitry 212, example user interface control circuitry 214, and an example database 216.

In the illustrated example of FIG. 2, the sensor interface circuitry 202 obtains and/or otherwise receives sensor data from the vehicle sensors 108 and/or the trailer sensors 110 of FIG. 1. For example, the sensor interface circuitry 202 obtains at least one of a tongue load of the trailer 102 on a tongue of the vehicle 100 from the load sensor(s) 108A, image data from the backup camera 108B, a front ride height and/or a rear ride height from the ride height sensor(s) 108C, a yaw rate (e.g., a yaw angle rate) of the vehicle 100 from the yaw rate sensor 108D, the vehicle pitch from the vehicle pitch sensor 108E, the vehicle roll from the vehicle roll sensor 108F, a longitudinal acceleration of the vehicle 100 from the longitudinal acceleration sensor 108G, a lateral acceleration of the vehicle 100 from the lateral acceleration sensor 108H, and a wheel speed of the wheels 106 from the wheel speed sensor 108I. In some examples, the sensor interface circuitry 202 also obtains a yaw rate of the trailer 102, a trailer pitch, a trailer weight, and/or a trailer acceleration from the trailer sensors 110. In some examples, the sensor interface circuitry 202 provides the sensor data to the database 216 for storage therein.

The example database 216 stores the sensor data utilized and/or obtained by the vehicle control circuitry 104. The example database 216 of FIG. 2 is implemented by any memory, storage device and/or storage disc for storing data such as, for example, flash memory, magnetic media, optical media, solid state memory, hard drive(s), thumb drive(s), etc. Furthermore, the sensor data stored in the example database 216 may be in any data format such as, for example, binary data, comma delimited data, tab delimited data, structured query language (SQL) structures, etc. While, in the illustrated example, the example database 216 is illustrated as a single device, the example database 216 and/or any other data storage devices described herein may be implemented by any number and/or type(s) of memories.

In the illustrated example of FIG. 2, the parameter calculation circuitry 204 calculates one or more vehicle parameters based on the sensor data. In some examples, the vehicle parameters include parameters that are not directly measured by the vehicle sensors 108 and/or the trailer sensors 110. For example, the parameter calculation circuitry 204 calculates a relative yaw displacement between the vehicle 100 and the trailer 102. In some examples, the parameter calculation circuitry 204 calculates the relative yaw displacement by comparing the vehicle yaw rate of the vehicle 100 and the trailer yaw rate of the trailer 102 from the sensor data. In such examples, the parameter calculation circuitry 204 integrates a difference between the vehicle yaw rate and the trailer yaw rate to determine the relative yaw displacement. In other examples, the parameter calculation circuitry 204 determines the relative yaw displacement based on image data from the backup camera 108B. In such examples, the parameter calculation circuitry 204 utilizes image processing techniques to detect positions of the trailer 102 in frames of the image data, and determines the relative yaw displacement based on the positions.

In some examples, the parameter calculation circuitry 204 determines a slip angle (e.g., a vehicle axle side slip angle) by integrating a difference between the measured yaw rate and a modeled yaw rate (e.g., a theoretical yaw rate). In some examples, the modeled yaw rate is calculated by executing a model (e.g., a bicycle model) based on vehicle parameters. The vehicle parameters can include the sensor data (e.g., the lateral and/or longitudinal acceleration, the wheel speed, etc.) associated with the vehicle 100 and/or a coefficient of friction between tires of the vehicle 100 and a surface of the road. In some examples, the parameter calculation circuitry 204 calculates a yaw rate error (e.g., in degrees per second) by calculating the difference between the measured yaw rate and the modeled yaw rate. The parameter calculation circuitry 204 integrates the yaw rate error to determine a yaw angle error, and/or determines a derivative of the yaw rate error. Furthermore, in some examples, the parameter calculation circuitry 204 calculates tire contact forces on the wheels 106 of the vehicle 100. For example, the parameter calculation circuitry 204 calculates the tire contact forces based on a vehicle weight, a vehicle height at an estimated center of gravity of the vehicle 100, longitudinal and lateral acceleration of the vehicle 100, the tongue load data, and/or the vehicle pitch.

In some examples, the parameter calculation circuitry 204 determines whether the trailer 102 is connected to the vehicle 100 based on the tongue load data from the load sensor(s) 108A, the image data from the backup camera 108B, an electrical load and/or resistance on a trailer electrical connector between the trailer 102 and the vehicle 100, and/or from user input to the user interface 130 of FIG. 1. In such examples, in response to determining that the trailer 102 is connected to the vehicle 100 and the vehicle 100 is not moving (e.g., the measured wheel speed is zero), the parameter calculation circuitry 204 determines a starting pitch of the vehicle 100. For example, the starting pitch corresponds to the pitch of the vehicle 100 when the vehicle 100 is stationary (e.g., not moving). In some examples, the parameter calculation circuitry 204 determines that the starting pitch is zero (e.g., the vehicle 100 is substantially parallel to the ground). In some examples, the parameter calculation circuitry 204 provides calculated vehicle parameters (e.g., the relative yaw displacement, the tire contact force(s), the yaw rate error, the yaw angle error, the derivative of the yaw rate error, and/or the starting pitch) to the database 216 for storage therein.

In the illustrated example of FIG. 2, the stability monitoring circuitry 206 monitors the sensor data and/or the calculated vehicle parameters to detect and/or monitor a vehicle stability condition associated with the vehicle 100. For example, the vehicle stability condition indicates whether the vehicle 100 is stable (e.g., no swaying and/or instability of the vehicle 100 is occurring) and/or whether understeer and/or oversteer behavior of the vehicle 100 is present. In some examples, the stability monitoring circuitry 206 calculates and/or otherwise determines, based on the sensor data and/or the vehicle parameters, a vehicle stability index associated with the vehicle 100. In some examples, the vehicle stability index is a value (e.g., a numerical value, a percentage) that represents the vehicle stability condition. In some examples, the stability monitoring circuitry 206 calculates and/or otherwise determines the vehicle stability index periodically during operation of the vehicle 100. For example, the stability monitoring circuitry 206 can determine the vehicle stability index at regular intervals (e.g., every 1 second, every 5 seconds) while the vehicle 100 is driven. In some examples, the stability monitoring circuitry 206 determines the vehicle stability index in substantially real time.

In some examples, the stability monitoring circuitry 206 determines the vehicle stability index by evaluating one or more of the calculated vehicle parameters based on respective control deadbands. For example, the stability monitoring circuitry 206 compares each of the yaw rate error, the yaw angle error, and the derivative of the yaw angle error to its respective control deadband. In some examples, the stability monitoring circuitry 206 selects one of the yaw rate error, the yaw angle error, or the derivative of the yaw angle error that is closest to its respective control deadband. In such examples, the vehicle stability index corresponds to a proportion (e.g., a percentage) of the selected parameter relative to its respective control deadband. For example, in response to the selected parameter using 80% of its respective oversteer control deadband, the stability monitoring circuitry 206 determines that the vehicle stability index is 80% (e.g., 0.8). In another example, in response to the selected parameter using 50% of its respective understeer control deadband, the stability monitoring circuitry 206 determines that the vehicle stability index is −50% (e.g., −0.5).

Additionally or alternatively, the stability monitoring circuitry 206 may execute one or more machine learning models based on the sensor data and/or the calculated vehicle parameters. In some examples, the machine learning model(s) are trained prior to implementation by the stability monitoring circuitry 206. In some examples, the stability monitoring circuitry 206 provides input data as input to the one or more models, where the input data includes the yaw angle rate, the tire contact forces, the longitudinal acceleration, the lateral acceleration, and/or the wheel speed associated with the vehicle 100. In some examples, in response to executing the machine learning model(s) based on the input data, the stability monitoring circuitry 206 determines the vehicle stability index based on output from the machine learning model(s).

In this example, the stability monitoring circuitry 206 compares the vehicle stability index to one or more thresholds to determine whether understeer and/or oversteer of the vehicle 100 is present. For example, a first threshold corresponds to understeer of the vehicle 100 and/or the trailer 102, and a second threshold corresponds to oversteer of the vehicle 100 and/or the trailer 102. In some examples, the first threshold corresponds to a vehicle stability index of −20% and the second threshold corresponds to a vehicle stability index of +20%. In other examples, the first threshold and/or the second threshold may be different (e.g., −100% and +100%, −50% and +50%, etc.). In some examples, the vehicle stability index, the first threshold, and/or the second threshold are represented as numerical values (e.g., 0, 5, 10, etc.) instead of percentage values. In some examples, the second threshold is greater than the first threshold. In other examples, the first threshold and the second threshold are the same (e.g., zero).

In some examples, the stability monitoring circuitry 206 determines that the vehicle 100 and/or the trailer 102 is/are stable (e.g., no oversteer or understeer is occurring) when the vehicle stability index satisfies the first threshold and the second threshold. For example, the stability monitoring circuitry 206 determines that the first threshold is satisfied when the vehicle stability index is greater than or equal to the first threshold, and determines that the second threshold is satisfied when the vehicle stability index is less than or equal to the second threshold. In other examples, the stability monitoring circuitry 206 determines that the first threshold is satisfied when the vehicle stability index is less than or equal to the first threshold, and determines that the second threshold is satisfied when the vehicle stability index is greater than or equal to the second threshold.

In this example, the stability monitoring circuitry 206 detects an instability condition of the vehicle 100 in response to the vehicle stability index not satisfying at least one of the first threshold or the second threshold. For example, in response to determining that the vehicle stability index does not satisfy the first threshold (e.g., the vehicle stability index is less than the first threshold), the stability monitoring circuitry 206 detects understeer of the vehicle 100 and/or the trailer 102. Conversely, in response to determining that the vehicle stability index does not satisfy the second threshold (e.g., the vehicle stability index is greater than the second threshold), the stability monitoring circuitry 206 detects oversteer of the vehicle 100 and/or the trailer 102. In some examples, the stability monitoring circuitry 206 activates the stability control circuitry 208 in response to detecting oversteer and/or understeer of the vehicle 100 and/or the trailer 102.

In the illustrated example of FIG. 2, the user interface control circuitry 214 controls the user interface 130 of FIG. 1. For example, the user interface control circuitry 214 controls a display of the user interface 130. In some examples, in response to the stability control circuitry 208 in response to detecting oversteer and/or understeer of the vehicle 100 and/or the trailer 102, the user interface control circuitry 214 causes the display of the user interface 130 to display an indication (e.g., a warning) to an operator of the vehicle 100. In some such examples, the user interface control circuitry 214 causes the display of the user interface 130 to display instructions to the operator, where the instructions instruct the operator to reduce a speed of the vehicle 100, increase the speed of the vehicle 100, pull the vehicle 100 over to a side of the road, etc.

In the illustrated example of FIG. 2, the stability control circuitry 208 controls the load distribution on the vehicle 100 based on the vehicle stability condition detected by the stability monitoring circuitry 206. For example, the stability control circuitry 208 adjusts the load distribution by controlling, via the suspension control circuitry 210, the suspension system 116 of FIG. 1. Additionally or alternatively, the stability control circuitry 208 adjusts the load distribution by controlling, via the tension control circuitry 212, the tensioning system 114 of FIG. 1. In some examples, the stability control circuitry 208 adjusts the load distribution to return the vehicle 100 and/or the trailer 102 to a stable condition (e.g., where no understeer and/or oversteer of the vehicle 100 is present). In some examples, the stability control circuitry 208 determines a target load distribution for the vehicle 100 based on the detected vehicle stability condition and/or the vehicle stability index. For example, the stability control circuitry 208 determines target tire contact forces at the respective wheels 106. Additionally or alternatively, the stability control circuitry 208 determines a target pitch of the vehicle 100 to achieve the target load distribution. In some examples, when the vehicle stability condition indicates understeer of the vehicle 100, the target load distribution is a forward-shifted load distribution (e.g., having increased tire contact forces on the front wheels 106A, 106B and reduced tire contact forces on the rear wheels 106C, 106D). Conversely, when the vehicle stability condition indicates oversteer of the vehicle 100, the target load distribution is a rearward-shifted load distribution (e.g., having reduced tire contact forces on the front wheels 106A, 106B and increased tire contact forces on the rear wheels 106C, 106D). In some examples, the stability control circuitry 208 controls braking and/or acceleration of the vehicle 100 based on the target load distribution.

In the illustrated example of FIG. 2, the suspension control circuitry 210 adjusts the load distribution by adjusting the air springs 118, 120 of the rear wheels 106C, 106D of FIG. 1. In some examples, the suspension control circuitry 210 adjusts the air springs 118, 120 to achieve the target load distribution on the vehicle 100. For example, when understeer of the vehicle 100 is detected, the suspension control circuitry 210 causes the first air spring 118 and/or the second air spring 120 to extend. In such examples, the suspension control circuitry 210 causes the vehicle pitch to decrease, thus shifting the load distribution forward to the front wheels 106A, 106B. Conversely, when oversteer of the vehicle 100 is detected, the suspension control circuitry 210 causes the first air spring 118 and/or the second air spring 120 to retract. In such examples, the suspension control circuitry 210 causes the vehicle pitch to increase, thus shifting the load distribution rearward to the rear wheels 106C, 106D. In some examples, the suspension control circuitry 210 extends and/or retracts the air springs 118, 120 until the target load distribution is achieved.

In some examples, in addition to or instead of the suspension control circuitry 210 adjusting the air springs 118, 120, the tension control circuitry 212 adjusts the load distribution by controlling the tensioning system 114 operatively coupled to the trailer hitch 112. For example, the tension control circuitry 212 controls a tension applied to one or more chains by the tensioning system 114, where the chains are connected to one or more load bars of the trailer hitch 112. In some examples, adjusting the tension in the chain(s) adjusts the load distribution on the vehicle 100. For example, when understeer of the vehicle 100 is detected, the tension control circuitry 212 increases the tension on the chain(s) and/or the load bar(s) to cause the vehicle pitch to decrease, thus shifting the load distribution forward to the front wheels 106A, 106B. Conversely, when oversteer of the vehicle 100 is detected, the tension control circuitry 212 reduces the tension on the chain(s) and/or the load bar(s) to cause the vehicle pitch to increase, thus shifting the load distribution rearward to the rear wheels 106C, 106D. In some examples, the tension control circuitry 212 adjusts the tension on the chain(s) and/or the load bar(s) until the target load distribution is achieved. The tensioning system 114 of FIG. 1 is described further in detail below in connection with FIG. 3.

In some examples, the stability control circuitry 208 adjusts the load distribution via the suspension control circuitry 210 and/or the tension control circuitry 212 until the stability monitoring circuitry 206 determines that the vehicle 100 is at a stable condition (e.g., no understeer and/or oversteer of the vehicle 100 is detected). For example, in response to the stability monitoring circuitry 206 determining that the vehicle stability index satisfies the first and second thresholds, the stability control circuitry 208 maintains a current state of the air springs 118, 120 and/or a current tension on the chain (c) to maintain a current pitch and/or load distribution of the vehicle 100. In other examples, in response to the vehicle stability index satisfying the first and second thresholds, the causes the vehicle 100 to return to the starting pitch. For example, the stability control circuitry 208 adjusts, via the suspension control circuitry 210 and/or the tension control circuitry 212, the vehicle pitch until the vehicle 100 is at the starting pitch.

In some examples, the vehicle control circuitry 104 includes means for obtaining sensor data. For example, the means for obtaining sensor data may be implemented by the sensor interface circuitry 202. In some examples, the sensor interface circuitry 202 may be implemented by machine executable instructions such as that implemented by at least blocks 502 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the sensor interface circuitry 202 is implemented by other hardware logic circuitry, hardware implemented state machines, and/or any other combination of hardware, software, and/or firmware. For example, the sensor interface circuitry 202 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 104 includes means for calculating. For example, the means for calculating may be implemented by the parameter calculation circuitry 204. In some examples, the parameter calculation circuitry 204 may be implemented by machine executable instructions such as that implemented by at least blocks 504, 506 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the parameter calculation circuitry 204 is implemented by other hardware logic circuitry, hardware implemented state machines, and/or any other combination of hardware, software, and/or firmware. For example, the parameter calculation circuitry 204 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 104 includes means for monitoring. For example, the means for monitoring may be implemented by the stability monitoring circuitry 206. In some examples, the stability monitoring circuitry 206 may be implemented by machine executable instructions such as that implemented by at least blocks 508, 510, 522 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the stability monitoring circuitry 206 is implemented by other hardware logic circuitry, hardware implemented state machines, and/or any other combination of hardware, software, and/or firmware. For example, the stability monitoring circuitry 206 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 104 includes means for interfacing. For example, the means for interfacing may be implemented by the user interface control circuitry 214. In some examples, the user interface control circuitry 214 may be implemented by machine executable instructions such as that implemented by at least block 512 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the user interface control circuitry 214 is implemented by other hardware logic circuitry, hardware implemented state machines, and/or any other combination of hardware, software, and/or firmware. For example, the user interface control circuitry 214 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the vehicle control circuitry 104 includes means for controlling. For example, the means for controlling may be implemented by the stability control circuitry 208. In some examples, the stability control circuitry 208 may be implemented by machine executable instructions such as that implemented by at least blocks 514, 516, 518, 520 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the stability control circuitry 208 is implemented by other hardware logic circuitry, hardware implemented state machines, and/or any other combination of hardware, software, and/or firmware. For example, the stability control circuitry 208 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for controlling includes means for adjusting suspension. For example, the means for adjusting suspension may be implemented by the suspension control circuitry 210. In some examples, the suspension control circuitry 210 may be implemented by machine executable instructions such as that implemented by at least blocks 516, 520 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the suspension control circuitry 210 is implemented by other hardware logic circuitry, hardware implemented state machines, and/or any other combination of hardware, software, and/or firmware. For example, the suspension control circuitry 210 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

In some examples, the means for controlling includes means for adjusting tension. For example, the means for adjusting tension may be implemented by the tension control circuitry 212. In some examples, the tension control circuitry 212 may be implemented by machine executable instructions such as that implemented by at least blocks 516, 520 of FIG. 5 executed by processor circuitry, which may be implemented by the example processor circuitry 612 of FIG. 6, the example processor circuitry 700 of FIG. 7, and/or the example Field Programmable Gate Array (FPGA) circuitry 800 of FIG. 8. In other examples, the tension control circuitry 212 is implemented by other hardware logic circuitry, hardware implemented state machines, and/or any other combination of hardware, software, and/or firmware. For example, the tension control circuitry 212 may be implemented by at least one or more hardware circuits (e.g., processor circuitry, discrete and/or integrated analog and/or digital circuitry, an FPGA, an Application Specific Integrated Circuit (ASIC), a comparator, an operational-amplifier (op-amp), a logic circuit, etc.) structured to perform the corresponding operation without executing software or firmware, but other structures are likewise appropriate.

Figure 3:
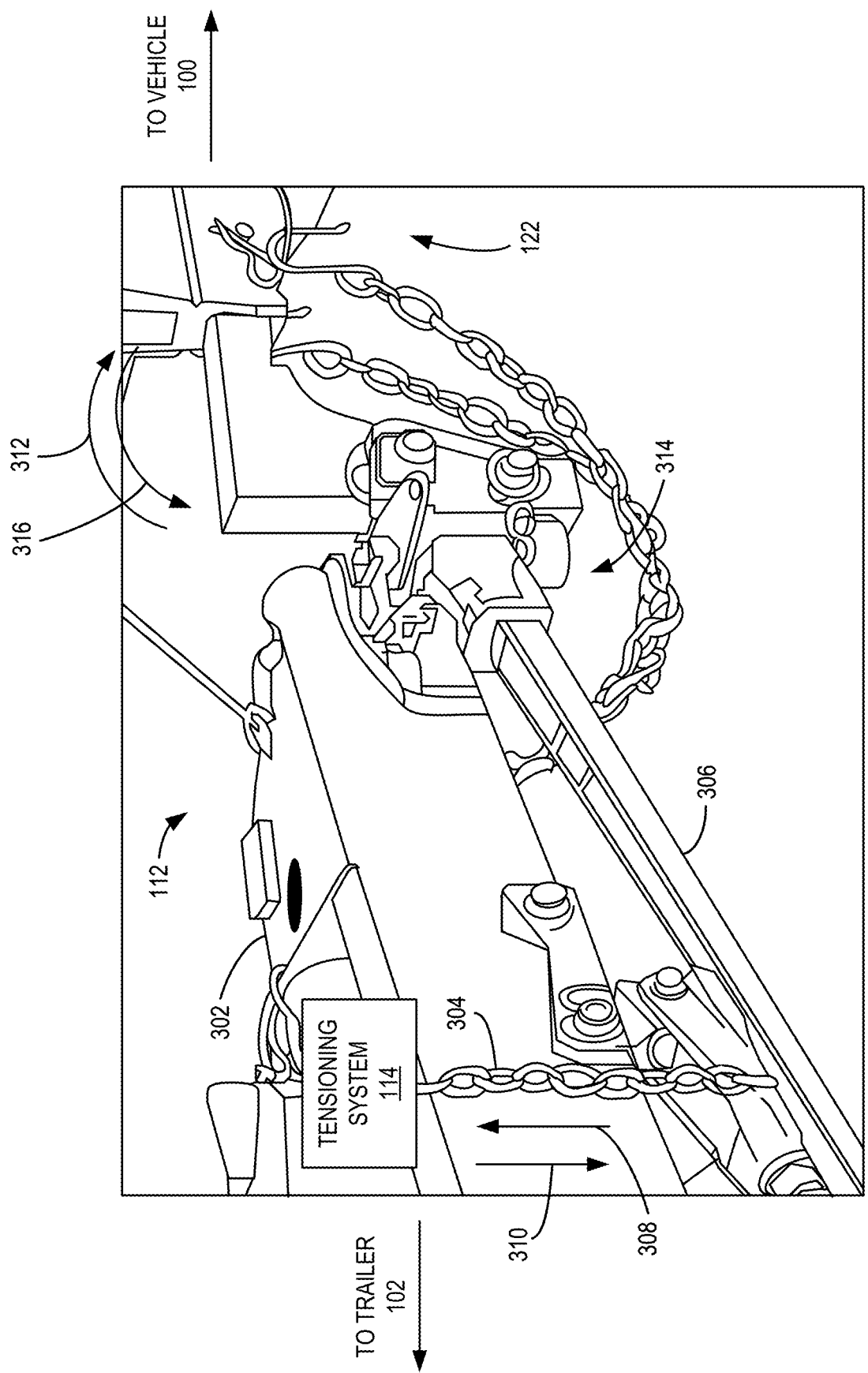
FIG. 3 illustrates an example trailer hitch coupled between the vehicle and the trailer.

FIG. 3 illustrates the example trailer hitch 112 coupled between the vehicle 100 and the trailer 102. In the illustrated example of FIG. 3, the tensioning system 114 is coupled to an example trailer frame 302 of the trailer 102 and operatively coupled to an example chain 304, where the chain 304 is coupled to an example load bar (e.g., spring bar, cantilever bar) 306 of the trailer hitch 112. In this example, the tensioning system 114 adjusts tension in the chain 304 to control a position of the load bar 306, where the tension is selected based on control signals from the suspension control circuitry 210 of FIG. 2. For example, the tensioning system 144 can increase the tension on the chain 304 to pull the chain 304 and, thus, the load bar 306 in an example upward direction 308. Conversely, the tensioning system 144 can reduce the tension by releasing the chain 304, thus causing the load bar 306 to move in an example downward direction 310. While the one load bar 306 and the one chain 304 is shown in the illustrated example of FIG. 3, the trailer hitch 112 can include multiple ones of the load bar 306 and/or the chain 304 in other examples.

In the illustrated example of FIG. 3, in response to the tensioning system 114 pulling the chain 304 and/or the load bar 306 in the upward direction 308, the load bar 306 produces an example clockwise moment 312 at the vehicle 100. In such examples, the clockwise moment 312 produces an upward force on the rear end 122 of the vehicle 100 that causes the rear end 122 to move in the upward direction 308, thus shifting the load distribution of the vehicle 100 to the front wheels 106A, 106B. Conversely, in response to the tensioning system 114 releasing the chain 304 and moving the load bar 306 in the downward direction 310, the load bar 306 produces an example counterclockwise moment 316 at the vehicle 100. In such examples, the counterclockwise moment 316 produces a downward force on the rear end 122 of the vehicle 100 that causes the rear end 122 to move in the downward direction 310, thus shifting the load distribution of the vehicle 100 to the rear wheels 106C, 106D.

Figure 4A:
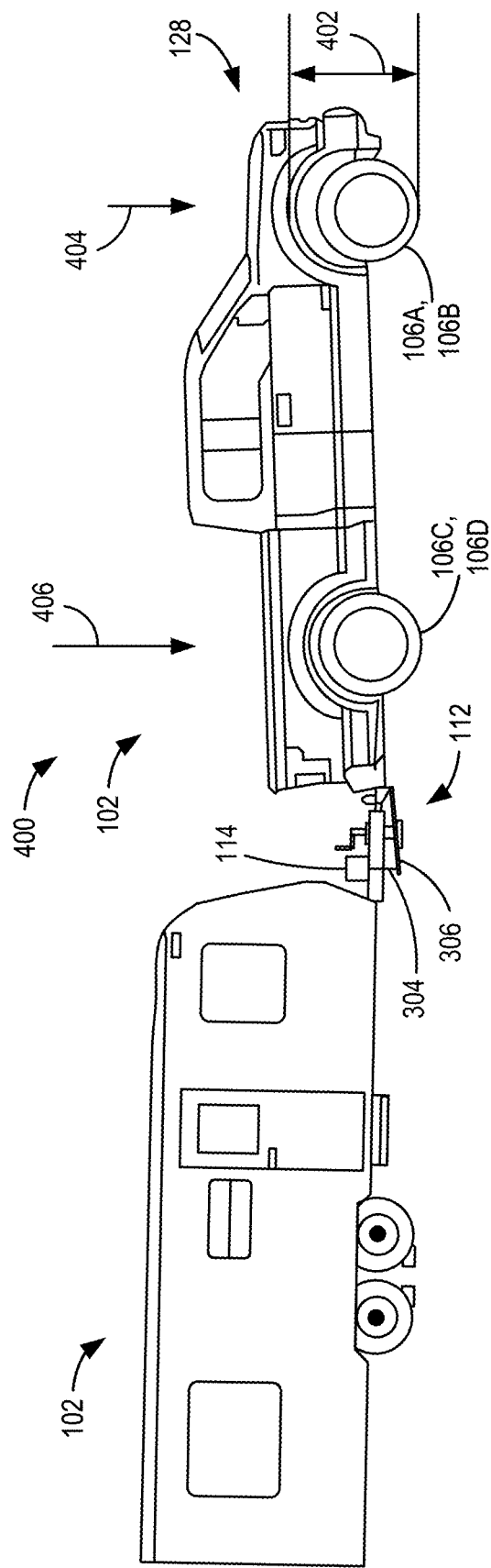
FIG. 4A is a side view of the example trailer and the example vehicle of FIG. 1 having a first load distribution.

FIG. 4A is a side view of the example vehicle 100 and the example trailer 102 having a first load distribution (e.g., a rearward-shifted load distribution) 400. In the illustrated example of FIG. 4A, the tensioning system 114 releases and/or otherwise reduces tension on the chain 304 to move the load bar 306 of the trailer hitch 112 downward and, thus, increase the pitch of the vehicle 100. In this example, the front end 128 of the vehicle 100 is at a first example ride height 402. When the vehicle 100 is at the first ride height 402, a combined weight of the trailer 102 and the vehicle 100 produces a first example front load 404 on the front wheels 106A, 106B and a first example rear load 406 on the rear wheels 106C, 106D, where the first rear load 406 is greater than the first front load 404. In some examples, the rearward-shifted load distribution 400 of FIG. 4A can be used to reduce oversteer of the vehicle 100 and/or the trailer 102.

Figure 4B:
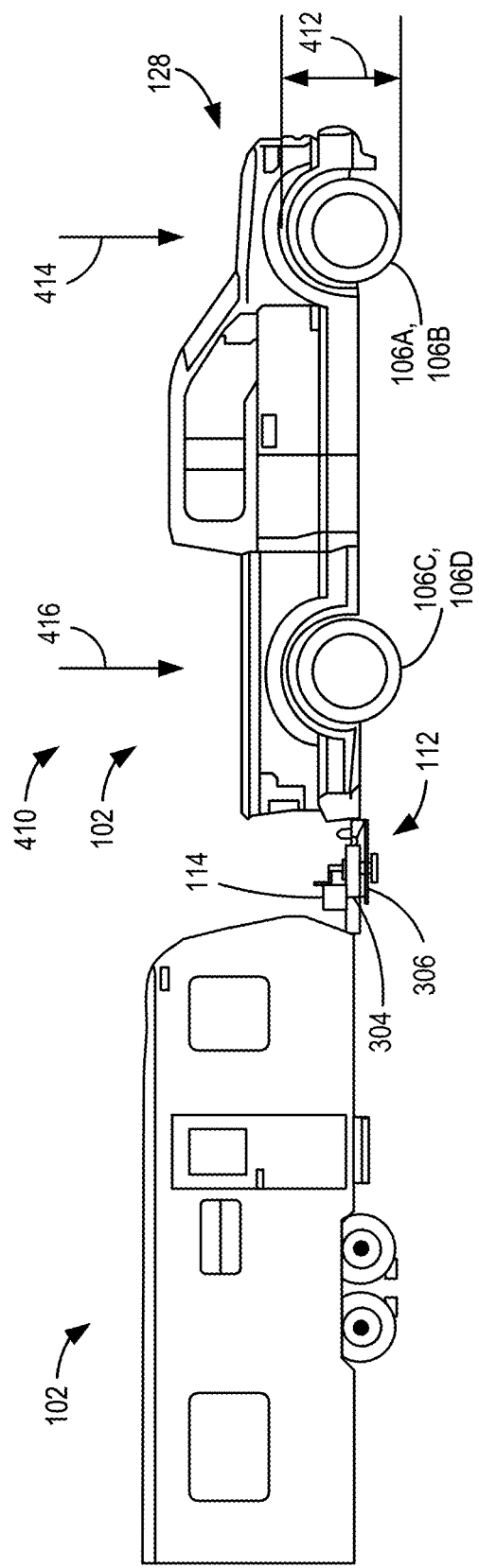
FIG. 4B is a side view of the example trailer and the example vehicle of FIG. 1 having a second load distribution.

FIG. 4B is a side view of the example vehicle 100 and the example trailer 102 having a second load distribution (e.g., a forward-shifted load distribution) 410. In the illustrated example of FIG. 4B, the tensioning system 114 pulls and/or otherwise increase tension on the chain 304 to move the load bar 306 of the trailer hitch 112 upward and, thus, reduce the pitch of the vehicle 100. In this example, the front end 128 of the vehicle 100 is at a second example ride height 412, where the second ride height 412 is less than the first ride height 402 of FIG. 4A. When the vehicle 100 is at the second ride height 412, the combined weight of the trailer 102 and the vehicle 100 produces a second example front load 414 on the front wheels 106A, 106B and a second example rear load 416 on the rear wheels 106C, 106D. In this example, the second front load 414 is greater than the corresponding first front load 404 of FIG. 4A, and the second rear load 416 is less than the corresponding first rear load 406 of FIG. 4A. In some examples, the forward-shifted load distribution 410 of FIG. 4B can be used to reduce understeer of the vehicle 100 and/or the trailer 102.

While an example manner of implementing the vehicle control circuitry 104 of FIG. 1 is illustrated in FIG. 2, one or more of the elements, processes, and/or devices illustrated in FIG. 2 may be combined, divided, re-arranged, omitted, eliminated, and/or implemented in any other way. Further, the example sensor interface circuitry 202, the example parameter calculation circuitry 204, the example stability monitoring circuitry 206, the example stability control circuitry 208, the example suspension control circuitry 210, the example tension control circuitry 212, the example user interface control circuitry 214, the example database 216, and/or, more generally, the example vehicle control circuitry 104 of FIG. 2, may be implemented by hardware, software, firmware, and/or any combination of hardware, software, and/or firmware. Thus, for example, any of the example sensor interface circuitry 202, the example parameter calculation circuitry 204, the example stability monitoring circuitry 206, the example stability control circuitry 208, the example suspension control circuitry 210, the example tension control circuitry 212, the example user interface control circuitry 214, the example database 216, and/or, more generally, the example vehicle control circuitry 104, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). When reading any of the apparatus or system claims of this patent to cover a purely software and/or firmware implementation, at least one of the example sensor interface circuitry 202, the example parameter calculation circuitry 204, the example stability monitoring circuitry 206, the example stability control circuitry 208, the example suspension control circuitry 210, the example tension control circuitry 212, the example user interface control circuitry 214, and/or the example database 216 is/are hereby expressly defined to include a non-transitory computer readable storage device or storage disk such as a memory, a digital versatile disk (DVD), a compact disk (CD), a Blu-ray disk, etc., including the software and/or firmware. Further still, the example vehicle control circuitry 104 of FIG. 1 may include one or more elements, processes, and/or devices in addition to, or instead of, those illustrated in FIG. 2, and/or may include more than one of any or all of the illustrated elements, processes and devices.

Figure 5:
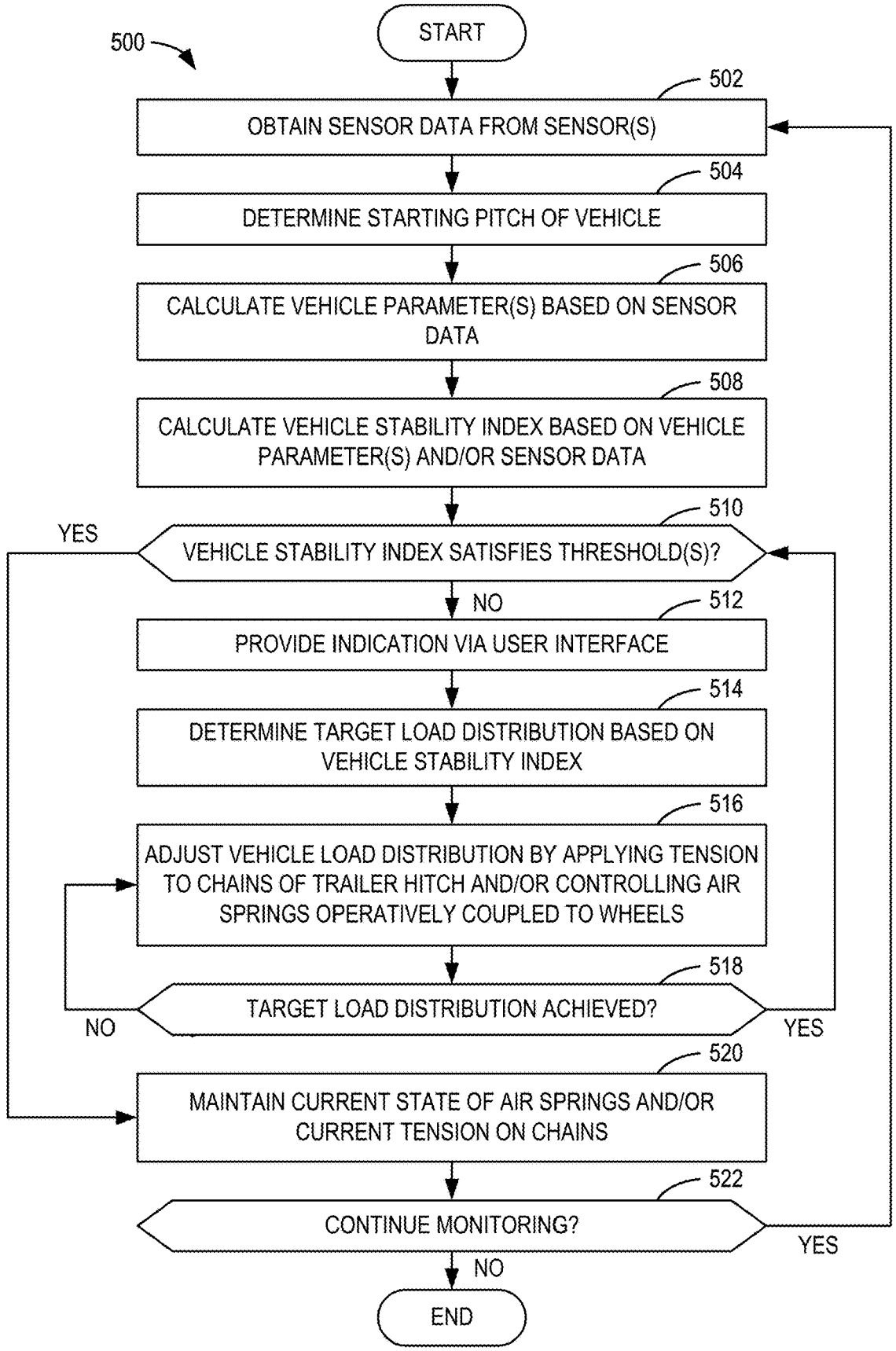
FIG. 5 is a flowchart representative of example machine readable instructions that may be executed by example processor circuitry to implement the example vehicle control circuitry of FIG. 2.

A flowchart representative of example hardware logic circuitry, machine readable instructions, hardware implemented state machines, and/or any combination thereof for implementing the vehicle control circuitry 104 of FIG. 2 is shown in FIG. 5. The machine readable instructions may be one or more executable programs or portion(s) of an executable program for execution by processor circuitry, such as the processor circuitry 612 shown in the example processor platform 600 discussed below in connection with FIG. 6 and/or the example processor circuitry discussed below in connection with FIGS. 7 and/or 8. The program may be embodied in software stored on one or more non-transitory computer readable storage media such as a CD, a floppy disk, a hard disk drive (HDD), a DVD, a Blu-ray disk, a volatile memory (e.g., Random Access Memory (RAM) of any type, etc.), or a non-volatile memory (e.g., FLASH memory, an HDD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 5, many other methods of implementing the example vehicle control circuitry 104 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU), etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium and non-transitory computer readable storage medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine readable instructions and/or example operations 500 that may be executed and/or instantiated by processor circuitry to implement the example vehicle control circuitry 104 of FIG. 2. The machine readable instructions and/or operations 500 of FIG. 5 begin at block 502, at which the example vehicle control circuitry 104 obtains sensor data from one or more of the vehicle sensors 108 and/or one or more of the trailer sensors 110 of FIG. 1. For example, the example sensor interface circuitry 202 of FIG. 2 obtains and/or otherwise receives the sensor data from the vehicle sensor(s) 108 and/or the trailer sensor(s) 110, where the sensor data can include image data, a tongue load of the trailer 102 on the vehicle 100, a ride height, lateral and/or longitudinal acceleration, vehicle yaw rate, vehicle pitch, and/or a wheel speed of the vehicle 100.

At block 504, the example vehicle control circuitry 104 determines a starting pitch of the vehicle 100. For example, the example parameter calculation circuitry 204 of FIG. 2 determines, based on the sensor data, the starting pitch of the vehicle 100 when the trailer 102 is connected thereto and the vehicle 100 is stationary (e.g., not moving).

At block 506, the example vehicle control circuitry 104 calculates one or more vehicle parameters based on the sensor data. For example, the example parameter calculation circuitry 204 calculates the vehicle parameters based on the sensor data, where the vehicle parameters include at least one of tire contact forces on the wheels 106 of the vehicle 100, a relative yaw displacement of the trailer 102 relative to the vehicle 100, a yaw rate error, a derivative of the yaw rate error, or a yaw angle error.

At block 508, the example vehicle control circuitry 104 calculates a vehicle stability index based on the one or more vehicle parameters and/or the sensor data. For example, the stability monitoring circuitry 206 calculates and/or otherwise determines the vehicle stability index by evaluating the calculated vehicle parameters relative to their respective control deadbands. In such examples, the vehicle stability index corresponds to a proportion of one of the vehicle parameters relative to its respective control deadband. In other examples, the stability monitoring circuitry 206 provides the sensor data and/or the vehicle parameter(s) as input to one or more models. In some examples, in response to execution of the one or more models, the stability monitoring circuitry 206 determines the vehicle stability index associated with an output of the model(s).

At block 510, the example vehicle control circuitry 104 determines whether the vehicle stability index satisfies one or more thresholds. For example, the stability monitoring circuitry 206 compares the vehicle stability index to a first threshold and a second threshold. In some examples, the first threshold corresponds to understeer of the vehicle 100, and the second threshold corresponds to oversteer of the vehicle 100. In response to the stability monitoring circuitry 206 determining that the vehicle stability index satisfies the first and second thresholds (e.g., block 510 returns a result of YES), control proceeds to block 520. Alternatively, in response to the stability monitoring circuitry 206 determining that the vehicle stability index does not satisfy at least one of the first threshold or the second threshold (e.g., block 510 returns a result of NO), control proceeds to block 512.

At block 512, the example vehicle control circuitry 104 provides an indication via the example user interface 130 of FIG. 1. For example, the example user interface control circuitry 214 of FIG. 2 causes the user interface to display the indication, where to indication can indicate a vehicle stability condition (e.g., whether understeer and/or oversteer is occurring). Additionally or alternatively, the user interface control circuitry 214 can provide instructions to an operator of the vehicle 100, where the instructions can instruct the operator to increase a speed of the vehicle 100, reduce the speed of the vehicle 100, pull the vehicle 100 to a side of the road, etc.

At block 514, the example vehicle control circuitry 104 determines a target load distribution based on the vehicle stability index. For example, the example stability control circuitry 208 of FIG. 2 determines the target load distribution based on whether the vehicle stability index indicates understeer or oversteer of the vehicle 100. In some such examples, the stability control circuitry 208 selects the first load distribution 400 of FIG. 4A as the target load distribution when the vehicle stability index indicates oversteer of the vehicle 100, and/or the stability control circuitry 208 selects the second load distribution 410 of FIG. 4B as the target load distribution when the vehicle stability index indicates understeer of the vehicle 100.

At block 516, the example vehicle control circuitry 104 adjusts a load distribution of the vehicle 100 by applying tension to the example chains 304 of the example trailer hitch 112 of FIG. 3 and/or controlling the example air springs 118, 120 of the example suspension system 116 of FIG. 1. For example, the example tension control circuitry 212 of FIG. 2 causes the tensioning system 114 to release and/or otherwise reduce tension on the chain 304 to shift the load distribution rearward on the vehicle 100, and/or causes the tensioning system 114 to pull and/or otherwise increase tension on the chain 304 to shift the load distribution forward on the vehicle 100. Additionally or alternatively, the example suspension control circuitry 210 of FIG. 2 causes the air springs 118, 120 to retract to shift the load distribution rearward on the vehicle 100, and/or causes the air springs 118, 120 to extend to shift the load distribution forward on the vehicle 100.

At block 518, the example vehicle control circuitry 104 determines whether the target load distribution is achieved. For example, the stability control circuitry 208 determines whether the load distribution of the vehicle matches and/or otherwise corresponds to the target load distribution. In response to the stability control circuitry 208 determining that the load distribution of the vehicle 100 is not at the target load distribution (e.g., block 518 returns a result of NO), control returns to block 516. Alternatively, in response to the stability control circuitry 208 determining that the load distribution of the vehicle 100 is at the target load distribution (e.g., block 518 returns a result of YES), control returns to block 510.

At block 520, the example vehicle control circuitry 104 maintains a current state of the air springs 118, 120 and/or maintain a current tension on the chains 304 of the example trailer hitch 112. In some examples, the stability control circuitry 208 maintains, via the suspension control circuitry 210 and/or the tension control circuitry 212, the current state of the air springs 118, 120 and/or the current tension on the chains 304 to maintain a current vehicle pitch of the vehicle 100. In other examples, the stability control circuitry 208 adjusts the air springs 118, 120 and/or the chains 304 to return the vehicle 100 to the starting pitch.

At block 522, the example vehicle control circuitry 104 determines whether to continue monitoring. For example, the stability monitoring circuitry 206 determines to continue monitoring when the vehicle 100 is moving (e.g., not stationary) and/or when additional sensor data is obtained by the sensor interface circuitry 202. In response to the stability monitoring circuitry 206 determining to continue monitoring (e.g., block 522 returns a result of YES), control returns to block 502. Alternatively, in response to the stability monitoring circuitry 206 determining not to continue monitoring (e.g., block 522 returns a result of NO), control ends.

Figure 6:
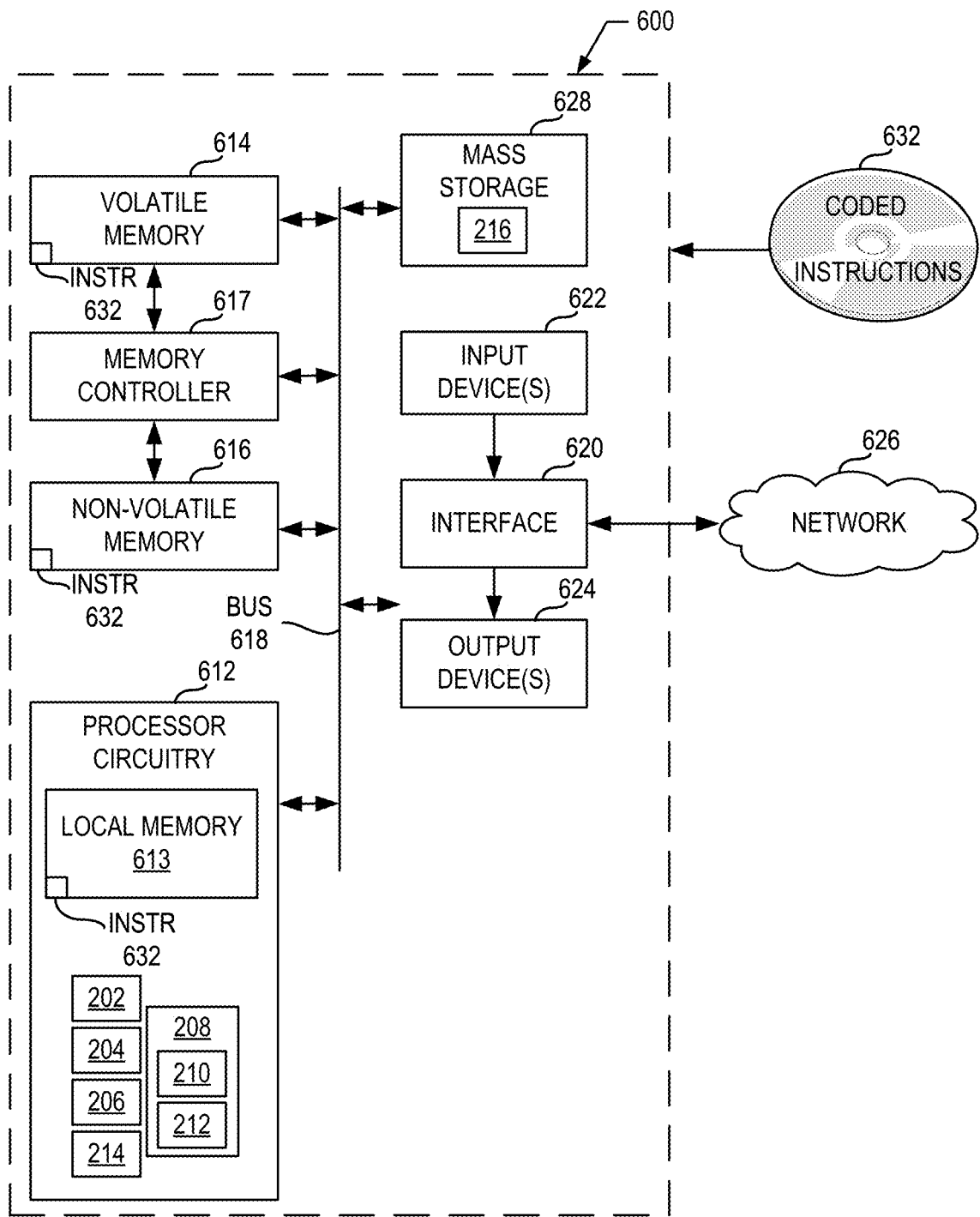
FIG. 6 is a block diagram of an example processing platform including processor circuitry structured to execute the example machine readable instructions of FIG. 5 to implement the example vehicle control circuitry of FIG. 2.

FIG. 6 is a block diagram of an example processor platform 600 structured to execute and/or instantiate the machine readable instructions and/or operations of FIG. 5 to implement the vehicle control circuitry 104 of FIG. 2. The processor platform 600 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing device.

The processor platform 600 of the illustrated example includes processor circuitry 612. The processor circuitry 612 of the illustrated example is hardware. For example, the processor circuitry 612 can be implemented by one or more integrated circuits, logic circuits, FPGAs microprocessors, CPUs, GPUs, DSPs, and/or microcontrollers from any desired family or manufacturer. The processor circuitry 612 may be implemented by one or more semiconductor based (e.g., silicon based) devices. In this example, the processor circuitry 612 implements the example sensor interface circuitry 202, the example parameter calculation circuitry 204, the example stability monitoring circuitry 206, the example stability control circuitry 208, the example suspension control circuitry 210, the example tension control circuitry 212, the example user interface control circuitry 214, and the example database 216.

The processor circuitry 612 of the illustrated example includes a local memory 613 (e.g., a cache, registers, etc.). The processor circuitry 612 of the illustrated example is in communication with a main memory including a volatile memory 614 and a non-volatile memory 616 by a bus 618. The volatile memory 614 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 616 may be implemented by flash memory and/or any other desired type of memory device. Access to the main memory 614, 616 of the illustrated example is controlled by a memory controller 617.

The processor platform 600 of the illustrated example also includes interface circuitry 620. The interface circuitry 620 may be implemented by hardware in accordance with any type of interface standard, such as an Ethernet interface, a universal serial bus (USB) interface, a Bluetooth® interface, a near field communication (NFC) interface, a PCI interface, and/or a PCIe interface.

In the illustrated example, one or more input devices 622 are connected to the interface circuitry 620. The input device(s) 622 permit(s) a user to enter data and/or commands into the processor circuitry 612. The input device(s) 422 can be implemented by, for example, an audio sensor, a microphone, a camera (still or video), a keyboard, a button, a mouse, a touchscreen, a track-pad, a trackball, an isopoint device, and/or a voice recognition system.

One or more output devices 624 are also connected to the interface circuitry 620 of the illustrated example. The output devices 624 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 620 of the illustrated example, thus, typically includes a graphics driver card, a graphics driver chip, and/or graphics processor circuitry such as a GPU.

The interface circuitry 620 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 626. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 600 of the illustrated example also includes one or more mass storage devices 628 to store software and/or data. Examples of such mass storage devices 628 include magnetic storage devices, optical storage devices, floppy disk drives, HDDs, CDs, Blu-ray disk drives, redundant array of independent disks (RAID) systems, solid state storage devices such as flash memory devices, and DVD drives.

The machine executable instructions 632, which may be implemented by the machine readable instructions of FIG. 5, may be stored in the mass storage device 628, in the volatile memory 614, in the non-volatile memory 616, and/or on a removable non-transitory computer readable storage medium such as a CD or DVD.

Figure 7:
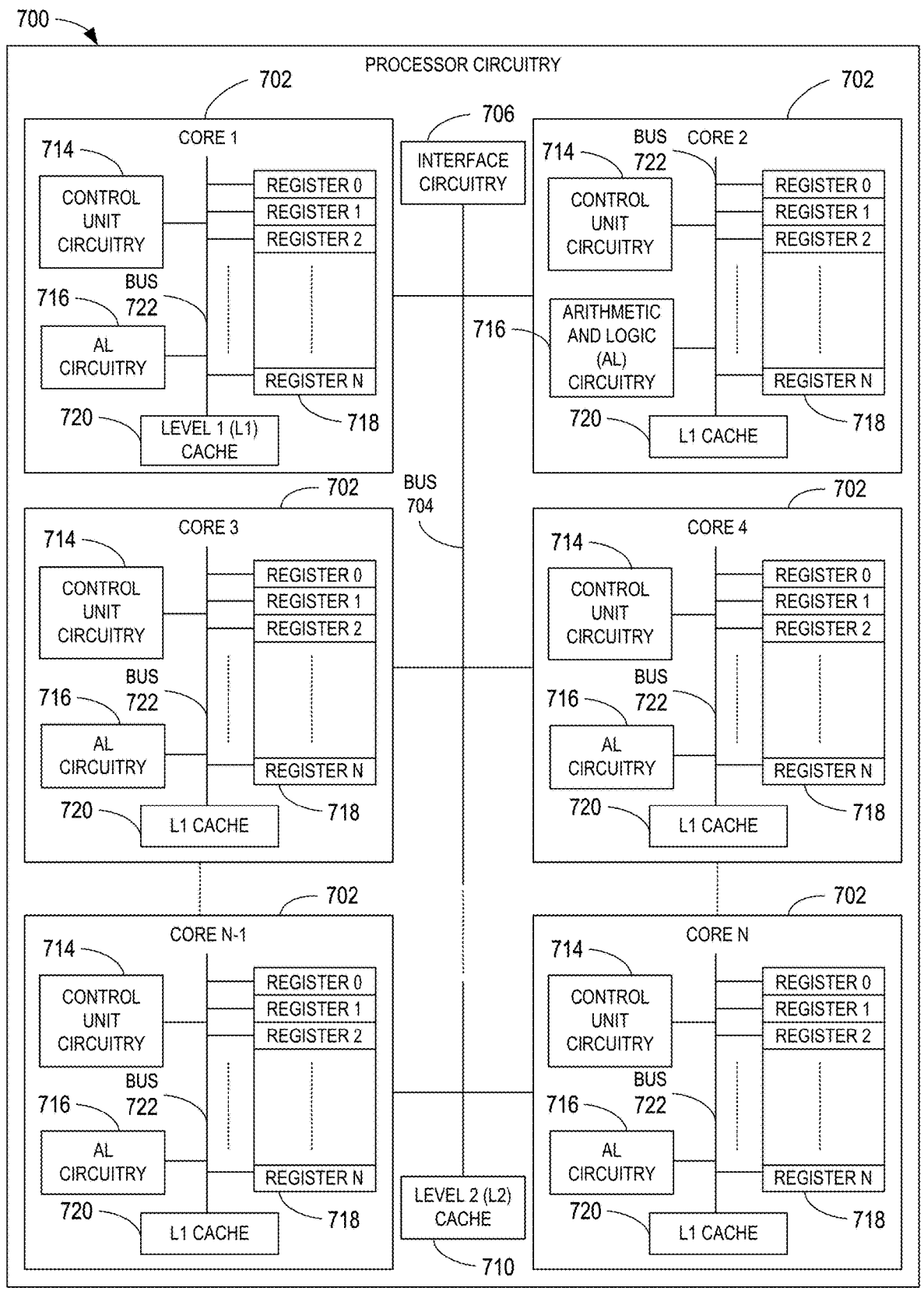
FIG. 7 is a block diagram of an example implementation of the processor circuitry of FIG. 6.

FIG. 7 is a block diagram of an example implementation of the processor circuitry 612 of FIG. 6. In this example, the processor circuitry 612 of FIG. 6 is implemented by a microprocessor 700. For example, the microprocessor 700 may implement multi-core hardware circuitry such as a CPU, a DSP, a GPU, an XPU, etc. Although it may include any number of example cores 702 (e.g., 1 core), the microprocessor 700 of this example is a multi-core semiconductor device including N cores. The cores 702 of the microprocessor 700 may operate independently or may cooperate to execute machine readable instructions. For example, machine code corresponding to a firmware program, an embedded software program, or a software program may be executed by one of the cores 702 or may be executed by multiple ones of the cores 702 at the same or different times. In some examples, the machine code corresponding to the firmware program, the embedded software program, or the software program is split into threads and executed in parallel by two or more of the cores 702. The software program may correspond to a portion or all of the machine readable instructions and/or operations represented by the flowchart of FIG. 5.

The cores 702 may communicate by an example bus 704. In some examples, the bus 704 may implement a communication bus to effectuate communication associated with one(s) of the cores 702. For example, the bus 704 may implement at least one of an Inter-Integrated Circuit (I2C) bus, a Serial Peripheral Interface (SPI) bus, a PCI bus, or a PCIe bus. Additionally or alternatively, the bus 704 may implement any other type of computing or electrical bus. The cores 702 may obtain data, instructions, and/or signals from one or more external devices by example interface circuitry 706. The cores 702 may output data, instructions, and/or signals to the one or more external devices by the interface circuitry 706. Although the cores 702 of this example include example local memory 720 (e.g., Level 1 (L1) cache that may be split into an L1 data cache and an L1 instruction cache), the microprocessor 700 also includes example shared memory 710 that may be shared by the cores (e.g., Level 2 (L2_cache)) for high-speed access to data and/or instructions. Data and/or instructions may be transferred (e.g., shared) by writing to and/or reading from the shared memory_10. The local memory 720 of each of the cores 702 and the shared memory 710 may be part of a hierarchy of storage devices including multiple levels of cache memory and the main memory (e.g., the main memory 614, 616 of FIG. 6). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 702 may be referred to as a CPU, DSP, GPU, etc., or any other type of hardware circuitry. Each core 702 includes control unit circuitry 714, arithmetic and logic (AL) circuitry (sometimes referred to as an ALU) 716, a plurality of registers 718, the L1 cache 720, and an example bus 722. Other structures may be present. For example, each core 702 may include vector unit circuitry, single instruction multiple data (SIMD) unit circuitry, load/store unit (LSU) circuitry, branch/jump unit circuitry, floating-point unit (FPU) circuitry, etc. The control unit circuitry 714 includes semiconductor-based circuits structured to control (e.g., coordinate) data movement within the corresponding core 702. The AL circuitry 716 includes semiconductor-based circuits structured to perform one or more mathematic and/or logic operations on the data within the corresponding core 702. The AL circuitry 716 of some examples performs integer based operations. In other examples, the AL circuitry 716 also performs floating point operations. In yet other examples, the AL circuitry 716 may include first AL circuitry that performs integer based operations and second AL circuitry that performs floating point operations. In some examples, the AL circuitry 716 may be referred to as an Arithmetic Logic Unit (ALU). The registers 718 are semiconductor-based structures to store data and/or instructions such as results of one or more of the operations performed by the AL circuitry 716 of the corresponding core 702. For example, the registers 718 may include vector register(s), SIMD register(s), general purpose register(s), flag register(s), segment register(s), machine specific register(s), instruction pointer register(s), control register(s), debug register(s), memory management register(s), machine check register(s), etc. The registers 718 may be arranged in a bank as shown in FIG. 7. Alternatively, the registers 718 may be organized in any other arrangement, format, or structure including distributed throughout the core 702 to shorten access time. The bus 720 may implement at least one of an I2C bus, a SPI bus, a PCI bus, or a PCIe bus Each core 702 and/or, more generally, the microprocessor 700 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 700 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 8:
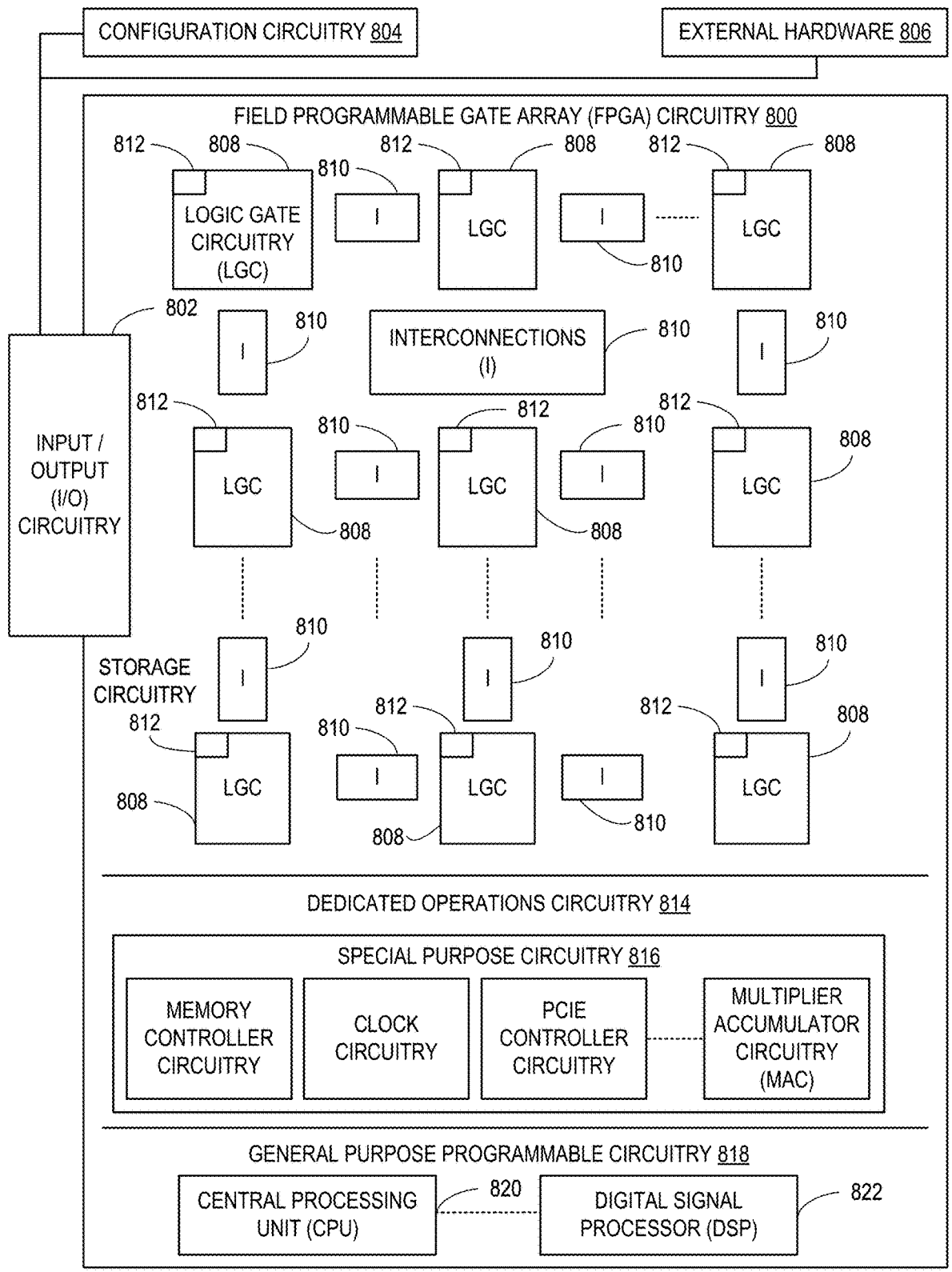
FIG. 8 is a block diagram of another example implementation of the processor circuitry of FIG. 6.

FIG. 8 is a block diagram of another example implementation of the processor circuitry 612 of FIG. 6. In this example, the processor circuitry 612 is implemented by FPGA circuitry 800. The FPGA circuitry 800 can be used, for example, to perform operations that could otherwise be performed by the example microprocessor 700 of FIG. 7 executing corresponding machine readable instructions. However, once configured, the FPGA circuitry 800 instantiates the machine readable instructions in hardware and, thus, can often execute the operations faster than they could be performed by a general purpose microprocessor executing the corresponding software.

More specifically, in contrast to the microprocessor 700 of FIG. 7 described above (which is a general purpose device that may be programmed to execute some or all of the machine readable instructions represented by the flowchart of FIG. 5 but whose interconnections and logic circuitry are fixed once fabricated), the FPGA circuitry 800 of the example of FIG. 8 includes interconnections and logic circuitry that may be configured and/or interconnected in different ways after fabrication to instantiate, for example, some or all of the machine readable instructions represented by the flowchart of FIG. 5. In particular, the FPGA 800 may be thought of as an array of logic gates, interconnections, and switches. The switches can be programmed to change how the logic gates are interconnected by the interconnections, effectively forming one or more dedicated logic circuits (unless and until the FPGA circuitry 800 is reprogrammed). The configured logic circuits enable the logic gates to cooperate in different ways to perform different operations on data received by input circuitry. Those operations may correspond to some or all of the software represented by the flowchart of FIG. 5. As such, the FPGA circuitry 800 may be structured to effectively instantiate some or all of the machine readable instructions of the flowchart of FIG. 5 as dedicated logic circuits to perform the operations corresponding to those software instructions in a dedicated manner analogous to an ASIC. Therefore, the FPGA circuitry 800 may perform the operations corresponding to the some or all of the machine readable instructions of FIG. 5 faster than the general purpose microprocessor can execute the same.

In the example of FIG. 8, the FPGA circuitry 800 is structured to be programmed (and/or reprogrammed one or more times) by an end user by a hardware description language (HDL) such as Verilog. The FPGA circuitry 800 of FIG. 8, includes example input/output (I/O) circuitry 802 to obtain and/or output data to/from example configuration circuitry 804 and/or external hardware (e.g., external hardware circuitry) 806. For example, the configuration circuitry 804 may implement interface circuitry that may obtain machine readable instructions to configure the FPGA circuitry 800, or portion(s) thereof. In some such examples, the configuration circuitry 804 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 806 may implement the microprocessor 700 of FIG. 7. The FPGA circuitry 800 also includes an array of example logic gate circuitry 808, a plurality of example configurable interconnections 810, and example storage circuitry 812. The logic gate circuitry 808 and interconnections 810 are configurable to instantiate one or more operations that may correspond to at least some of the machine readable instructions of FIG. 5 and/or other desired operations. The logic gate circuitry 808 shown in FIG. 8 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 808 to enable configuration of the electrical structures and/or the logic gates to form circuits to perform desired operations. The logic gate circuitry 808 may include other electrical structures such as look-up tables (LUTs), registers (e.g., flip-flops or latches), multiplexers, etc.

The interconnections 810 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 808 to program desired logic circuits.

The storage circuitry 812 of the illustrated example is structured to store result(s) of the one or more of the operations performed by corresponding logic gates. The storage circuitry 812 may be implemented by registers or the like. In the illustrated example, the storage circuitry 812 is distributed amongst the logic gate circuitry 808 to facilitate access and increase execution speed.

The example FPGA circuitry 800 of FIG. 8 also includes example Dedicated Operations Circuitry 814. In this example, the Dedicated Operations Circuitry 814 includes special purpose circuitry 816 that may be invoked to implement commonly used functions to avoid the need to program those functions in the field. Examples of such special purpose circuitry 816 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 800 may also include example general purpose programmable circuitry 818 such as an example CPU 820 and/or an example DSP 822. Other general purpose programmable circuitry 818 may additionally or alternatively be present such as a GPU, an XPU, etc., that can be programmed to perform other operations.

Although FIGS. 7 and 8 illustrate two example implementations of the processor circuitry 612 of FIG. 6, many other approaches are contemplated. For example, as mentioned above, modern FPGA circuitry may include an on-board CPU, such as one or more of the example CPU 820 of FIG. 8. Therefore, the processor circuitry 612 of FIG. 6 may additionally be implemented by combining the example microprocessor 700 of FIG. 7 and the example FPGA circuitry 800 of FIG. 8. In some such hybrid examples, a first portion of the machine readable instructions represented by the flowchart of FIG. 5 may be executed by one or more of the cores 702 of FIG. 7 and a second portion of the machine readable instructions represented by the flowchart of FIG. 5 may be executed by the FPGA circuitry 800 of FIG. 8.

In some examples, the processor circuitry 612 of FIG. 6 may be in one or more packages. For example, the processor circuitry 700 of FIG. 7 and/or the FPGA circuitry 800 of FIG. 8 may be in one or more packages. In some examples, an XPU may be implemented by the processor circuitry 612 of FIG. 6, which may be in one or more packages. For example, the XPU may include a CPU in one package, a DSP in another package, a GPU in yet another package, and an FPGA in still yet another package.

From the foregoing, it will be appreciated that example systems, methods, apparatus, and articles of manufacture have been disclosed that control stability of a vehicle and a trailer. The disclosed systems, methods, apparatus, and articles of manufacture determine a vehicle stability condition (e.g., understeer and/or oversteer of the vehicle) based on sensor data from the vehicle and/or the trailer. Examples disclosed herein adjust a load distribution on the vehicle based on the vehicle stability condition. For example, the disclosed systems, methods, apparatus, and articles of manufacture adjust the load distribution by controlling tension on a chain of a trailer hitch and/or air springs operatively coupled to wheels of the vehicle. The disclosed systems, methods, apparatus, and articles of manufacture improve the efficiency of using a computing device by reducing manual input required from an operator of the vehicle to adjust the vehicle pitch. Furthermore, by automatically controlling the vehicle pitch to adjust for understeer and/or oversteer of the vehicle, examples disclosed herein improve accuracy of steering of the vehicle. The disclosed systems, methods, apparatus, and articles of manufacture are accordingly directed to one or more improvement(s) in the operation of a machine such as a computer or other electronic and/or mechanical device.

Example methods, apparatus, systems, and articles of manufacture to control stability of a vehicle and trailer are disclosed herein. Further examples and combinations thereof include the following:

Example 1 includes an apparatus to control stability of a vehicle and trailer, the apparatus comprising stability monitoring circuitry to determine, based on sensor data from one or more sensors of the vehicle, whether a vehicle stability condition associated with the vehicle is satisfied, and stability control circuitry to, in response to the vehicle stability condition not being satisfied, adjust a load distribution on front wheels and rear wheels of the vehicle by adjusting a vehicle pitch.

Example 2 includes the apparatus of example 1, wherein the stability control circuitry further includes suspension control circuitry to adjust the vehicle pitch by controlling one or more air springs operatively coupled to the rear wheels.

Example 3 includes the apparatus of example 1, wherein the stability control circuitry further includes tension control circuitry to adjust the vehicle pitch by adjusting tension on chains of a trailer hitch coupled between the vehicle and the trailer.

Example 4 includes the apparatus of example 1, wherein the stability monitoring circuitry is to determine a vehicle stability index based on the sensor data, compare the vehicle stability index to a first threshold and a second threshold, determine that the vehicle stability condition is satisfied in response to the vehicle stability index satisfying the first and second thresholds, and determine that the vehicle stability condition is not satisfied in response to the vehicle stability index not satisfying at least one of the first threshold or the second threshold.

Example 5 includes the apparatus of example 4, further including parameter calculation circuitry to calculate, based on the sensor data, a relative yaw displacement between the vehicle and the trailer, the stability monitoring circuitry to determine the vehicle stability index based on the relative yaw displacement.

Example 6 includes the apparatus of example 4, wherein the stability control circuitry is to in response to the vehicle stability index not satisfying the first threshold, increase a first load on the front wheels and reduce a second load on the rear wheels, and in response to the vehicle stability index not satisfying the second threshold, reduce the first load on the front wheels and increase the second load on the rear wheels.

Example 7 includes the apparatus of example 4, wherein the first threshold corresponds to understeer of the vehicle and the trailer, and the second threshold corresponds to oversteer of the vehicle and the trailer.

Example 8 includes a non-transitory computer readable medium comprising instructions that, when executed, cause processor circuitry to determine, based on sensor data from one or more sensors of a vehicle, whether a vehicle stability condition associated with the vehicle is satisfied, and in response to the vehicle stability condition not being satisfied, adjust a load distribution on front wheels and rear wheels of the vehicle by adjusting a vehicle pitch.

Example 9 includes the non-transitory computer readable medium of example 8, wherein the instructions, when executed, cause the processor circuitry to adjust the vehicle pitch by controlling one or more air springs operatively coupled to the rear wheels.

Example 10 includes the non-transitory computer readable medium of example 8, wherein the instructions, when executed, cause the processor circuitry to adjust the vehicle pitch by adjusting tension on chains of a trailer hitch coupled between the vehicle and a trailer.

Example 11 includes the non-transitory computer readable medium of example 8, wherein the instructions, when executed, cause the processor circuitry to determine a vehicle stability index based on the sensor data, compare the vehicle stability index to a first threshold and a second threshold, determine that the vehicle stability condition is satisfied in response to the vehicle stability index satisfying the first and second thresholds, and determine that the vehicle stability condition is not satisfied in response to the vehicle stability index not satisfying at least one of the first threshold or the second threshold.

Example 12 includes the non-transitory computer readable medium of example 11, wherein the instructions, when executed, cause the processor circuitry to calculate, based on the sensor data, a relative yaw displacement between the vehicle and a trailer, the processor circuitry to determine the vehicle stability index based on the relative yaw displacement.

Example 13 includes the non-transitory computer readable medium of example 11, wherein the instructions, when executed, cause the processor circuitry to in response to the vehicle stability index not satisfying the first threshold, increase a first load on the front wheels and reduce a second load on the rear wheels, and in response to the vehicle stability index not satisfying the second threshold, reduce the first load on the front wheels and increase the second load on the rear wheels.

Example 14 includes the non-transitory computer readable medium of example 11, wherein the first threshold corresponds to understeer of the vehicle, and the second threshold corresponds to oversteer of the vehicle.

Example 15 includes an apparatus comprising memory, instructions, and processor circuitry to execute the instructions to determine, based on sensor data from one or more sensors of a vehicle, whether a vehicle stability condition associated with the vehicle is satisfied, and in response to determining that the vehicle stability condition is not satisfied, adjust a load distribution on front wheels and rear wheels of the vehicle by adjusting a vehicle pitch.

Example 16 includes the apparatus of example 15, wherein the processor circuitry is to execute the instructions to adjust the vehicle pitch by controlling one or more air springs operatively coupled to the rear wheels.

Example 17 includes the apparatus of example 15, wherein the processor circuitry is to execute the instructions to adjust the vehicle pitch by adjusting tension on chains of a trailer hitch coupled between the vehicle and a trailer.

Example 18 includes the apparatus of example 15, wherein the processor circuitry is to execute the instructions to determine a vehicle stability index based on the sensor data, compare the vehicle stability index to a first threshold and a second threshold, determine that the vehicle stability condition is satisfied in response to the vehicle stability index satisfying the first and second thresholds, and determine that the vehicle stability condition is not satisfied in response to the vehicle stability index not satisfying at least one of the first threshold or the second threshold.

Example 19 includes the apparatus of example 18, wherein the processor circuitry is to execute the instructions to calculate, based on the sensor data, a relative yaw displacement between the vehicle and a trailer, the processor circuitry to determine the vehicle stability index based on the relative yaw displacement.

Example 20 includes the apparatus of example 18, wherein the processor circuitry is to execute the instructions to in response to the vehicle stability index not satisfying the first threshold, increase a first load on the front wheels and reduce a second load on the rear wheels, and in response to the vehicle stability index not satisfying the second threshold, reduce the first load on the front wheels and increase the second load on the rear wheels.

Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus to control stability of a vehicle and trailer, the apparatus comprising:
   stability monitoring circuitry to:
   determine, based on first sensor data obtained from one or more sensors of the vehicle when the vehicle is stationary, a starting pitch of the vehicle; and
   determine, based on second sensor data obtained from the one or more sensors when the vehicle is moving, whether a vehicle stability condition associated with the vehicle is satisfied; and
   stability control circuitry to;
   when the vehicle stability condition is not satisfied, adjust a load distribution on front wheels and rear wheels of the vehicle by adjusting a vehicle pitch; and
   when the vehicle stability condition is satisfied, return the vehicle pitch to the starting pitch.

2. The apparatus of claim 1, wherein the stability control circuitry further includes suspension control circuitry to adjust the vehicle pitch by controlling one or more air springs operatively coupled to the rear wheels.

3. The apparatus of claim 1, wherein the stability control circuitry further includes tension control circuitry to adjust the vehicle pitch by adjusting tension on chains of a trailer hitch coupled between the vehicle and the trailer.

4. The apparatus of claim 1, wherein the stability monitoring circuitry is to:
   determine a vehicle stability index based on the second sensor data;
   compare the vehicle stability index to a first threshold and a second threshold;
   determine that the vehicle stability condition is satisfied when the vehicle stability index satisfies the first and second thresholds; and
   determine that the vehicle stability condition is not satisfied when the vehicle stability index does not satisfy at least one of the first threshold or the second threshold.

5. The apparatus of claim 4, further including parameter calculation circuitry to calculate, based on the second sensor data, a relative yaw displacement between the vehicle and the trailer, the stability monitoring circuitry to determine the vehicle stability index based on the relative yaw displacement.

6. The apparatus of claim 4, wherein the stability control circuitry is to:
   when the vehicle stability index does not satisfy the first threshold, increase a first load on the front wheels and reduce a second load on the rear wheels; and
   when the vehicle stability index does not satisfy the second threshold, reduce the first load on the front wheels and increase the second load on the rear wheels.

7. The apparatus of claim 4, wherein the first threshold corresponds to understeer of the vehicle and the trailer, and the second threshold corresponds to oversteer of the vehicle and the trailer.

8. A non-transitory computer readable medium comprising instructions that, when executed, cause processor circuitry to:
   determine, based on first sensor data obtained from one or more sensors of a vehicle when the vehicle is stationary, a starting pitch of the vehicle;
   determine, based on second sensor data obtained from the one or more sensors when the vehicle is moving, whether a vehicle stability condition associated with the vehicle is satisfied;
   when the vehicle stability condition is not satisfied, adjust a load distribution on front wheels and rear wheels of the vehicle by adjusting a vehicle pitch; and
   when the vehicle stability condition is satisfied, return the vehicle pitch to the starting pitch.

9. The non-transitory computer readable medium of claim 8, wherein the instructions, when executed, cause the processor circuitry to adjust the vehicle pitch by controlling one or more air springs operatively coupled to the rear wheels.

10. The non-transitory computer readable medium of claim 8, wherein the instructions, when executed, cause the processor circuitry to adjust the vehicle pitch by adjusting tension on chains of a trailer hitch coupled between the vehicle and a trailer.

11. The non-transitory computer readable medium of claim 8, wherein the instructions, when executed, cause the processor circuitry to:
    determine a vehicle stability index based on the second sensor data;
    compare the vehicle stability index to a first threshold and a second threshold;
    determine that the vehicle stability condition is satisfied when the vehicle stability index satisfies the first and second thresholds; and
    determine that the vehicle stability condition is not satisfied when the vehicle stability index does not satisfy at least one of the first threshold or the second threshold.

12. The non-transitory computer readable medium of claim 11, wherein the instructions, when executed, cause the processor circuitry to calculate, based on the second sensor data, a relative yaw displacement between the vehicle and a trailer, the processor circuitry to determine the vehicle stability index based on the relative yaw displacement.

13. The non-transitory computer readable medium of claim 11, wherein the instructions, when executed, cause the processor circuitry to:
    when the vehicle stability index does not satisfy the first threshold, increase a first load on the front wheels and reduce a second load on the rear wheels; and
    when the vehicle stability index does not satisfy the second threshold, reduce the first load on the front wheels and increase the second load on the rear wheels.

14. The non-transitory computer readable medium of claim 11, wherein the first threshold corresponds to understeer of the vehicle, and the second threshold corresponds to oversteer of the vehicle.

15. An apparatus comprising:
    memory;
    instructions; and
    processor circuitry to execute the instructions to:
    determine, based on first sensor data from one or more sensors of a vehicle when the vehicle is stationary, a starting pitch of the vehicle;
    determine, based on second sensor data obtained from the one or more sensors when the vehicle is moving, whether a vehicle stability condition associated with the vehicle is satisfied;
    when the vehicle stability condition is not satisfied, adjust a load distribution on front wheels and rear wheels of the vehicle by adjusting a vehicle pitch; and
    when the vehicle stability condition is satisfied, return the vehicle pitch to the starting pitch.

16. The apparatus of claim 15, wherein the processor circuitry is to execute the instructions to adjust the vehicle pitch by controlling one or more air springs operatively coupled to the rear wheels.

17. The apparatus of claim 15, wherein the processor circuitry is to execute the instructions to adjust the vehicle pitch by adjusting tension on chains of a trailer hitch coupled between the vehicle and a trailer.

18. The apparatus of claim 15, wherein the processor circuitry is to execute the instructions to:
- determine a vehicle stability index based on the second sensor data;
- compare the vehicle stability index to a first threshold and a second threshold;
- determine that the vehicle stability condition is satisfied when the vehicle stability index satisfies the first and second thresholds; and
- determine that the vehicle stability condition is not satisfied when the vehicle stability index does not satisfy at least one of the first threshold or the second threshold.

19. The apparatus of claim 18, wherein the processor circuitry is to execute the instructions to calculate, based on the second sensor data, a relative yaw displacement between the vehicle and a trailer, the processor circuitry to determine the vehicle stability index based on the relative yaw displacement.

20. The apparatus of claim 18, wherein the processor circuitry is to execute the instructions to:
- when the vehicle stability index does not satisfy the first threshold, increase a first load on the front wheels and reduce a second load on the rear wheels; and
- when the vehicle stability index does not satisfy the second threshold, reduce the first load on the front wheels and increase the second load on the rear wheels.

* * * * *